Dec. 20, 1932.     T. J. FITZSIMMONS     1,891,349
TELEPHONE WIRE CONNECTING MEANS FOR RAILWAY TRAINS
Filed Feb. 14, 1927
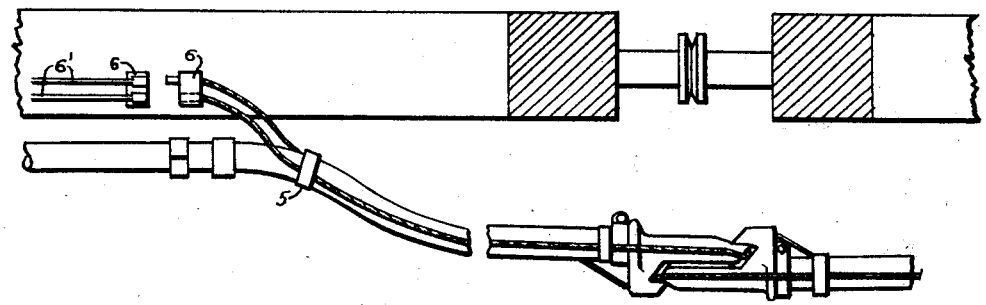
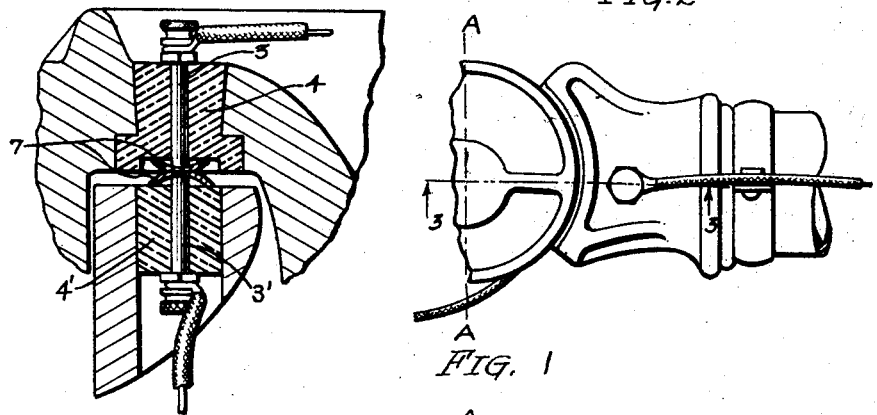
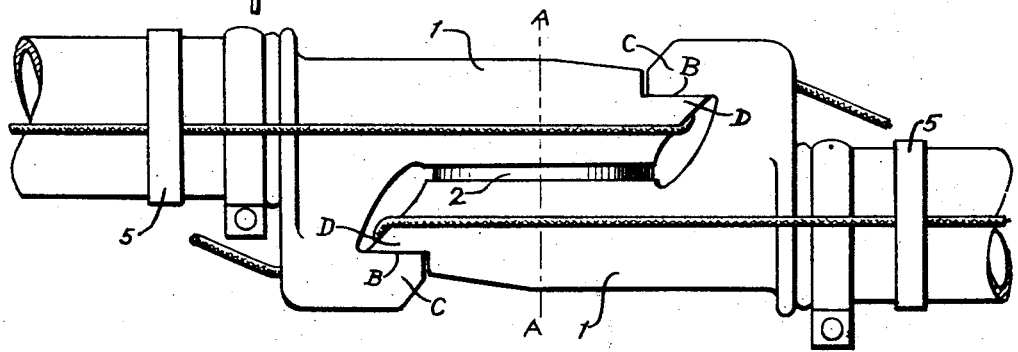
INVENTOR.
Thomas J. Fitzsimmons.
BY
ATTORNEY.

Patented Dec. 20, 1932　　　　　　　　　　　　　　　　　　　　　　　1,891,349

UNITED STATES PATENT OFFICE

THOMAS J. FITZSIMMONS, OF TOPEKA, KANSAS

TELEPHONE WIRE CONNECTING MEANS FOR RAILWAY TRAINS

Application filed February 14, 1927. Serial No. 168,180.

My invention relates to a telephone wire connecting means for railway trains.

The object of my invention is to provide a connecting means that will automatically engage when the air brake hose coupling is connected and also to disconnect when the hose coupling is disengaged unintentionally or separated by force without damage should the train become uncoupled.

A further object of my invention is to provide for the connecting means a wire attached to the hose as a unit therewith.

A still further object of my invention is to provide a connecting means that will not interfere with the coupling and uncoupling of the hose.

These and other objects will hereinafter be more fully explained.

Referring to the drawing:

Fig. 1 is a side view of a standard hose coupling for a railway train air brake system.

Fig. 2 is a plan view of a fragmentary portion of the coupling.

Fig. 3 is an enlarged sectional view taken on line 3—3 in Fig. 2.

Fig. 4 is a reduced side view of the coupling in its relative position to the bumpers of the adjoining ends of the cars, and also showing the plug connecting means for the phone wires.

The invention herein disclosed is designed to connect the wiring system installed in coaches or other makes of transportation cars in connection with railway trains, said phone connecting means to be controlled by one of the essential coupling elements known as an air brake system. Therefore the coupling or closing of the phone system will be likewise assured by the coupling of the members 1 and 1' as shown in Fig. 1.

The said members 1 and 1' are similar in construction and adapted to rock to engagement on the axis line A as shown in Figs. 1 and 2. The said coupling members are equipped with a flexible gasket 2 as air tight sealing means for the circulation of the compressed air passing from one hose to the other. And as a binding means the said members slidably engage with each other as at B at which point I have provided a circuit closing means for the phone consisting of binding posts 3 and 3' functioning as a switch. The said posts are insulated by insulation members 4 and 4' by which means the electric current is connected without contacting the couplers. The wires being insulated are free to rest on the sides of the couplers and from thence extending to the hose and attached thereto by means of bands 5 and terminating into a plug connection 6 as shown in Fig. 4, at which point connection is made with the phone wire 6' extending through the train, the said plug being separated to show the possibility of removing the hose from the car carrying with it the phone wires.

When the hose is replaced it is readily seen how convenient the phone line may be connected so that the automatic closing of the circuit by the hose coupler will connect the phone system of the train. It will be understood that the contact means for the heads 7 of the binding posts is acquired by the expansion of the gasket 2. Therefore vibration of the contact points are eliminated.

It is shown in Fig. 3 that an aperture is drilled in the locking and binding lugs C and D of the hose coupling in which is placed the insulation members 4 and 4'. The said aperture being small in diameter is not sufficient to materially weaken the coupling as the contact of said lugs impose the pressure on the rubber gasket 2.

I do not confine my phone connecting means to any particular make of air brake couplings as other styles may be employed that may have similar cam like binding means, or the phone connecting means can be otherwise placed and rocked to engagement. While I have shown a binding post as in Fig. 3 it is possible to remove the insulation from the end of the wire and extend the same through the aperture and solder the convex discs 7 thereon by which means the binding posts 3 and 3' are eliminated.

Such other modifications may be employed as lie within the scope of the appended claims.

Having thus described my invention, what I claim as new and desire to secure by Letters Patent is:—

1. In a telephone wire connecting means for railway trains, in combination with a hose coupling of railway trains, binding posts for each of the nose and lug elements of the coupler, the posts having a convex head on one end thereof and means to connect the wires to the other end, the wires being exteriorly carried by the members of the hose coupler respectively, the nose and lug of each coupler member having an aperture drilled through each thereof to receive appropriate electric insulators, the insulators being apertured axially to receive the said binding posts respectively by which means the telephone circuit is closed when the members of the coupler are rocked to engagement.

2. In a metallic circuit connection means in combination with a train line air coupling, a metallic circuit comprising two insulated metal wires, the wires connected to two binding posts in each half of the coupling, the binding posts being positioned in the nose and lug of each half of the coupling and insulated therefrom, buttons positioned on the ends of the binding posts as contact means between the halves of the couplings substantially as shown.

THOMAS J. FITZSIMMONS.